United States Patent [19]

Musolino et al.

[11] 4,308,583

[45] Dec. 29, 1981

[54] ANTI-SKID DEVICE FOR A MOTOR VEHICLE BRAKING SYSTEM

[75] Inventors: Gesualdo Musolino; Carlo A. Quilico; Sergio Gillio, all of Turin, Italy

[73] Assignee: Centro Ricerche Fiat S.p.A., Orbassano, Italy

[21] Appl. No.: 54,057

[22] Filed: Jul. 2, 1979

[30] Foreign Application Priority Data

Jul. 4, 1978 [IT] Italy .................................. 68562 A/78

[51] Int. Cl.³ .............................................. B60T 8/08
[52] U.S. Cl. ...................................... 364/426; 303/93; 303/108
[58] Field of Search ................ 364/426; 303/93–95, 303/106, 108, 109, 119

[56] References Cited

U.S. PATENT DOCUMENTS

| | | | |
|---|---|---|---|
| 3,754,797 | 8/1973 | Rodi et al. | 188/181 C |
| 3,768,873 | 10/1973 | Hirzel | 303/109 |
| 3,776,357 | 12/1973 | Arai et al. | 303/109 |
| 3,909,070 | 9/1975 | Leiber | 303/109 |
| 3,910,644 | 10/1975 | Packer | 303/109 |
| 4,005,910 | 2/1977 | Leiber et al. | 303/106 |
| 4,053,188 | 10/1977 | Jonner | 303/109 |

*Primary Examiner*—Errol A. Krass
*Attorney, Agent, or Firm*—Sughrue, Mion, Zinn, Macpeak and Seas

[57] ABSTRACT

An anti-skid device for a motor vehicle braking system which releases the vehicle brakes in response to an output signal produced by an equality comparator circuit when a wheel speed signal from a lower value comparator falls to a value equal to that of a signal from an integrating memory, which integrates and stores a signal from an upper value comparator of wheel speed signals, indicating that the wheels have reached a predetermined slipping threshold.

6 Claims, 3 Drawing Figures

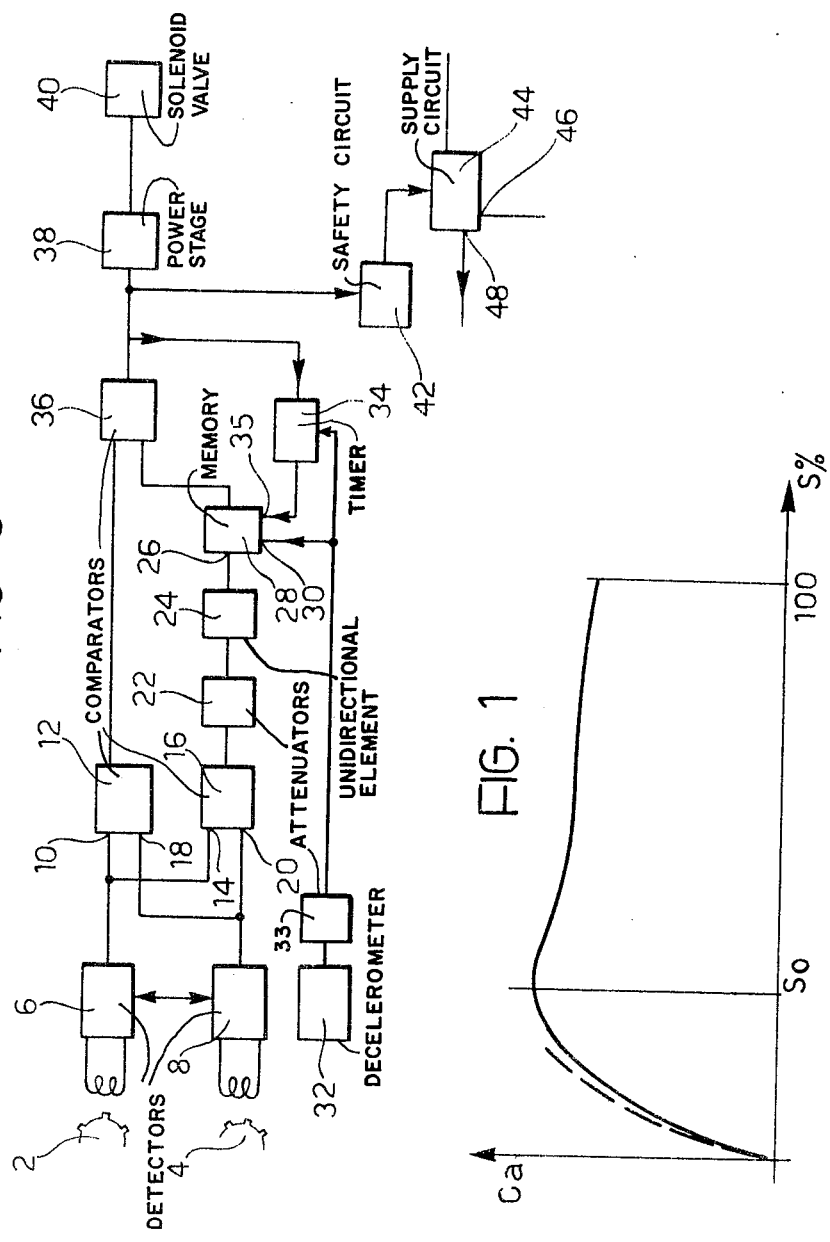

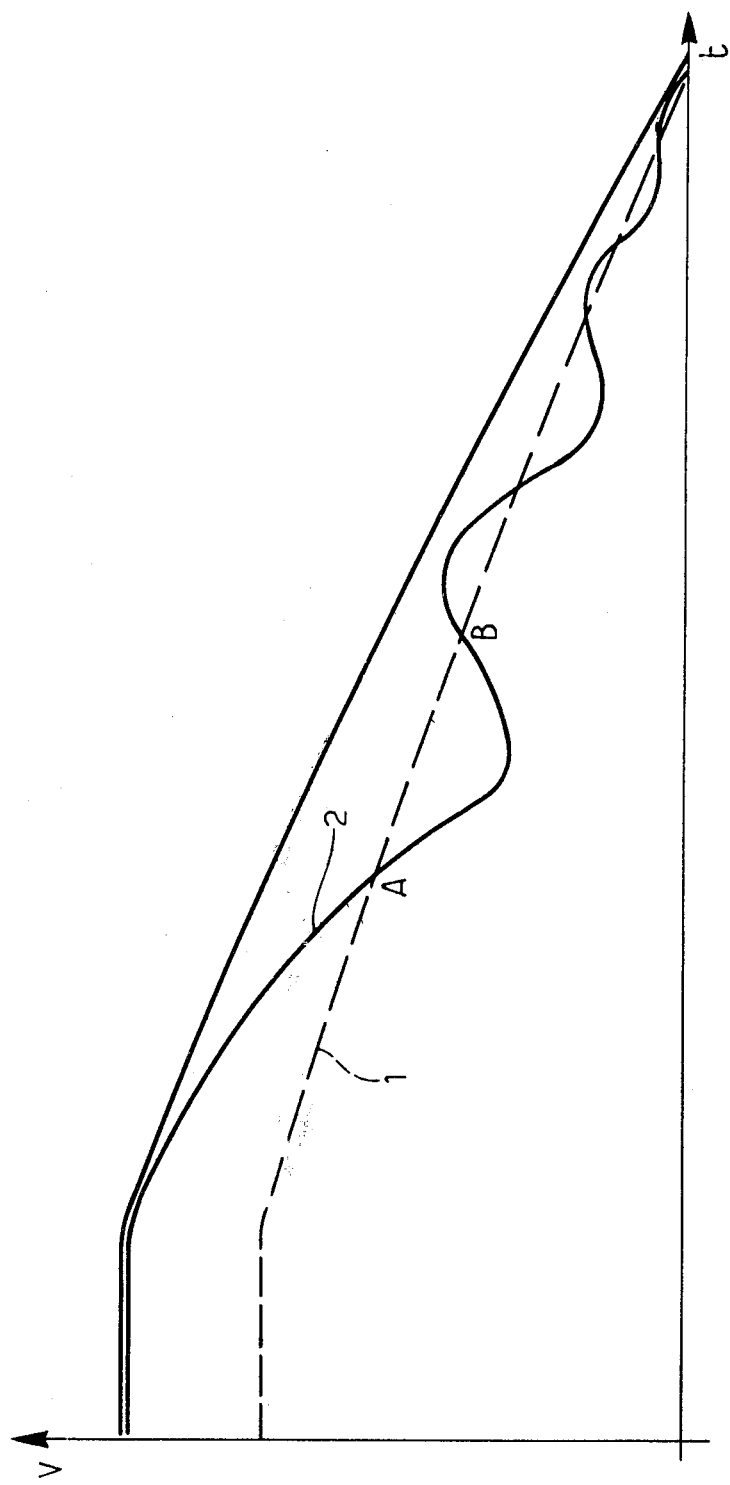

ANTI-SKID DEVICE FOR A MOTOR VEHICLE BRAKING SYSTEM

The present invention relates to a device for preventing the wheels of a vehicle from skidding during braking. Devices of this type will be referred to as "anti-skid" devices.

One known anti-skid device operates to release the vehicle brakes when a certain deceleration threshold is exceeded. That is the braking pressure is released when, by comparing the deceleration of the wheels with a fixed or variable deceleration threshold, it is detected that the deceleration of one or more of the wheels exceeds the threshold. Braking pressure is then reapplied when that wheel passes the deceleration threshold in the opposite direction. Another known device releases the brakes when a deceleration threshold is exceeded by one or more of the wheels, whereas the braking is resumed when, by means of a decelerometer mounted on board the vehicle, it is detected that the wheels have reached the same value of slipping which they had at the instant when the brakes were released by the device.

It has been established that with devices which operate to release the brakes in dependence on whether the deceleration of one or more wheels exceeds a certain threshold there exists the possibility of the occurrence of decelerations of the wheels greater than the deceleration of the vehicle but less than that of the deceleration threshold of the device; obviously in such a case the device does not operate to release the brakes although skidding of the wheels and consequent loss of control will be taking place. This is very dangerous because, in certain conditions, a vehicle provided with an anti-skid device of the type described above will be in a skidding state long before the wheels have locked and therefore the disadvantages which it was intended to avoid with the anti-skid device are not overcome.

The technical problem of the present invention is to provide an anti-skid device which operates on a threshold of sliding rather than on a deceleration threshold, so that whatever the deceleration of the wheel the device operates when a predetermined sliding state of a wheel is reached.

According to the present invention there is provided an anti-skid device for a motor vehicle braking system, which operates to release the vehicle brakes when at least one wheel reaches a predetermined slipping threshold, including detectors for detecting the speed of rotation of the two wheels of at least one axle, characterised in that it includes upper and lower value comparators for detecting the greater and the smaller of the signals from the detectors and for producing output signals representative thereof, the lower value comparator being connected to one input of an equality comparator circuit and the upper value comparator being connected via means for attenuating the signal by a predetermined percentage, to one input of integrating memory means the other input of which receives an output signal from a decelerometer mounted on the vehicle, said signal being attenuated by the same percentage as the signal from the upper value comparator, the output of the said integrating memory means being connected to the other input of the said equality comparator circuit whereby the latter produces an output signal when the signal from the lower value comparator falls to a value equal to the signal from the integrating memory indicating that one or both of the wheels has reached a predetermined threshold of slipping.

An advantage of the present invention is that it provides an anti-skid device which operates at a threshold of sliding and which, therefore, avoids the disadvantages set out above; moreover the device of the invention is of easy construction and is not of high cost.

One embodiment of the invention will now be more particularly described, by way of example, with reference to the accompanying drawings, in which:

FIG. 1 illustrates the law which relates the adhesion couple, on the ordinate, to the sliding of the wheel, as a percentage, on the abscissa;

FIG. 2 illustrates the variation of the velocity of the vehicle and that of a wheel being braked during operation of the device of the invention, with time being plotted along the abscissa and velocity being plotted along the ordinate; and FIG. 3 is a block diagram illustrating an embodiment of the invention.

Referring first to FIG. 1 which illustrates the law which relates the adhesion couple, referred to the ordinate, to the sliding percentage of the wheel, referred to the abscissa. The term "adhesion couple" will be understood to relate to the couple exerted between the tread of the tyre and the ground, and the term "sliding percentage" will be understood to relate to the difference between the velocity of the vehicle and the instantaneous speed of the wheel, which is given by the expression:

$$S=(Vv-Vr)/Vv$$

where:
Vv is the instantaneous velocity of the vehicle;
Vr is the instantaneous speed of the wheel.

The curve relating the adhesion couple to the sliding percentage can assume different configurations because it depends on the state of the tire, on the ground conditions and on the actual speed of the wheel. However, although its configuration can vary its general shape remains substantially the same over the range of different conditions. The curve has a first section rising to a maximum corresponding to about 15-20%, then falls slowly until it cuts off sharply at a value of sliding percentage of approximately 100%.

The first section of the curve, in which the sliding percentage is between 0 and the value So corresponding to the maximum value of the adhesion couple, is the so-called "pseudosliding" region where the difference between vehicle velocity and wheel speed is due to the flexure of the elements of the tire tread subjected to the stresses of braking. The maximum of the adhesion couple Ca occurs just before the elements of the tyre tread have reached the limit of adhesion, after which the tyre tread elements commence to slide with respect to the ground.

The section of the curve between the value of the sliding percentage So corresponding to the maximum value of the adhesion couple Ca and the value of the sliding percentage where S=100% and the wheel is locked and fully sliding is the so-called "slipping" region.

It will be apparent from what has been said that for most effective anti-skid operation the device of the invention will tend to work about the point So on the abscissa where the slipping percentage is in the region of 15%-20%.

Referring now to FIG. 3 which is a block schematic diagram of an embodiment of the device forming the subject of the invention, there are shown two phonic wheels 2, 4 which are connected respectively to the right and the left wheels of an axis of the vehicle. Signals generated by the said phonic wheels are fed to respective tachometric detectors 6 and 8; the tachometric detector 6 is connected to a first input 10 of a comparator circuit 12 the output of which is representative to the smaller of the signals fed to first and second inputs thereof and to a first input 14 of a comparator circuit 16 the output of which is representative of the greater of the signals fed to first and second inputs thereof. Correspondingly the output of the tachometric detector 8 is connected to the second input 18 of the comparator circuit 12 and to the second input 20 of the comparator circuit 16. The circuit 12 will hereinafter be referred to as a lower value comparator circuit since it selects the smaller of the two inputs and the circuit 16 will hereinafter be referred to as an upper value comparator circuit. The output of the upper value comparator circuit 16 is fed to an operational amplifier 22 which is connected, through a unidirectional element 24, to a first input 26 of a memory 28. The second input 30 of the memory 28 is fed from the output of a decelerometer 32 which is also connected to a timer circuit 34. The timer circuit 34 is connected to a third input 35 of the memory 28. The output of the lower value comparator circuit 12 and the output of the memory 28 are connected to a comparator circuit 36 which is connected to the timer circuit 34 and to a power stage 38 the output of which feeds an actuating solenoid valve 40; the comparator circuit 36 is also connected to a safety circuit 42 having an output connected to the supply circuit 44 which, as well as providing the supply to all the circuits of the device from an output 46, is also provided with an alarm output 48 for signalling possible damage or faults.

The device described above with reference to FIG. 3 operates as follows.

The signals from the phonic wheels 2,4 linked to the left and right wheels of the axis of the vehicle under consideration are frequency signals, these are fed to the tachometric detectors 6 and 8 respectively which transform them into electrical signals representative of the speed of the left and the right wheels respectively; these signals representative of the wheel speeds are passed to the comparator circuit 12 and the comparator circuit 16 which produce output signals representative of the smaller and the greater of the speeds of the controlled wheels respectively.

If the vehicle is travelling at constant speed and neither wheel is slipping the output signals from the comparators 12, 16 will be equal to one another and representative of the vehicle velocity. Likewise if the vehicle is braking but neither of the wheels is slipping the outputs from the comparators 12 and 16 will be equal to one another and representative of the instantaneous value of the vehicle velocity.

If, on the other hand the vehicle is braking and one wheel is slipping the upper value comparator 16 provides a signal representative of the velocity of the vehicle and the lower value comparator 12 provides a signal representative of the velocity of the wheel which is slipping. Similarly, if the vehicle is braking and both the wheels are slipping, then since the slipping of the two wheels will never be exactly the same, the upper value comparator 16 provides a signal representing a velocity value quite near to the vehicle velocity whilst the lower value comparator provides a signal representing the speed of the wheel which is slipping the most.

The signal of the comparator 16 is attenuated by a certain percentage equal to the desired slipping threshold, that is to say about 15-20%, on its passage through the operational amplifier 22.

The output of the operational amplifier 22 is passed, through the unidirectional element 24 to the memory 28, which may in the simplest embodiment simply be constituted by a capacitor the charge on which is also controlled by the signal from the decelerometer 32 which senses the deceleration of the vehicle. This decelerometer 32 has associated with it an attenuation circuit 33 for attenuating the signal which would otherwise be produced by the decelerometer by the same percentage as that produced by the operational amplifier circuit 22.

The rectifier 24 allows the signals from the comparator circuit 16 to pass for as long as these signals are greater than the value memorized in the memory 28. This value is, in effect, the instantaneous value of the vehicle velocity because the capacitive element of the memory 28 acts as an integrator to integrate the instantaneous deceleration signal fed to it from the decelerometer 32.

When the signal coming from the comparator 16 falls below the integrated value of the signal from the decelerometer the unidirectional element 24 prevents the signal from the comparator 16 from influencing the memory 28 which thereafter follows only the values provided by the decelerometer (attenuated, of course, by the desired slipping percentage as already indicated).

The output signal from the comparator 12, since it is not attenuated, is normally greater than the output signal from the memory 28 since this is generated by attenuated signals. If slipping of one wheel or the other occurs the output signal from the comparator 12 starts to fall as it represents the lower of the two input signals; when it has fallen to the same value as the output of the memory 28 the comparator 36 produces an output signal which is fed to the power stage 38 which in turn excites the solenoid 40 to release the brakes. This situation occurs at point A of the graph of FIG. 2.

The wheel which is slipping, or both wheels if both are slipping, now starts to regain speed since it or they are no longer being retarded by the brakes; when this wheel, or the slowest wheel if both are slipping, reaches a speed such that the signal from the lower value comparator 12 is again equal to the value in the memory 28 (point B of FIG. 2) the brakes are reapplied. If the wheel or wheels start to slip again this cycle is repeated as shown in FIG. 2.

If for any cause (for example by a defect of the decelerometer) the device should cut off the brakes for a period of time which is longer than a predetermined value the timer circuit 34 applies a signal to the memory 28 causing it to discharge so that its output signal falls thereby changing the input conditions to the comparator 36 which, via the power stage 38, de-excites the solenoid valve 40 thereby renewing the braking action.

The timing interval of the timer 34, which determines the maximum allowed duration of the brake releasing cycle, is not fixed but, by means not shown is made to vary in dependence on the value of the deceleration of the vehicle, with overriding limits of 0.5 seconds for 1 g and 1.5 seconds for 0 g.

Another safety feature is provided by the circuit 42 which, if the solenoid valve 40 remains continuously excited for a predetermined period for example for 2.5 seconds, cuts off the supply 46 to the circuit and activates the output 48 which leads to an alarm.

Although illustrated for the wheels of one axle the device may be extended to include sensors and associated circuits for both axles of a motor vehicle to operate independently of the circuit illustrated or jointly with such circuit.

What is claimed is:

1. In a motor vehicle braking system, an anti-skid device of the kind which operates to release brakes of the vehicle when at least one wheel reaches a predetermined slipping threshold, the said device having detectors for detecting the speed of rotation of the wheels on at least one axle, wherein the improvement consists in said device including:
   upper value comparator means for detecting the greater of the signals from said detectors and producing output signals representative thereof;
   lower value comparator means for detecting the lesser of the signals from said detectors and producing output signals representative thereof;
   an equality comparator circuit having an input connected to said lower value comparator means;
   integrating memory means having an input connected to said upper value comparator means and an output connected to an input of said equality comparator circuit;
   first signal attenuating means connected between said memory means and said upper value comparator means for attenuating a said output signal of said upper value comparator by a predetermined percentage;
   a decelerometer mounted on said vehicle and second signal attenuating means connected to the output of said decelerometer and to an input of said memory means which receives an output signal from said decelerometer attenuated by said second signal attenuating means said output signal of said decelerometer being attenuated by the same percentage as the signal from said upper value comparator means,
   whereby said equality comparator circuit produces an output signal when a signal from said lower value comparator falls to a value equal to a signal from said memory means indicating that a said wheel has reached said predetermined threshold of slipping.

2. An anti-skid device as defined in claim 1, wherein said equality comparator circuit has an output connected to a power stage, said power stage controlling a solenoid valve which releases said brakes when said output signal is generated by said equality comparator circuit.

3. An anti-skid device as defined in claim 1, wherein a unidirectional element is connected between said first attenuating means and said integrating memory means to allow signals to pass from said first attenuating means to said memory and to prevent signals from being applied to said first attenuating means when the output of said first attenuating means is lower than that of said memory means.

4. An anti-skid device as defined in claim 1, wherein said device further includes a timer circuit having an output connected to said memory means and an input connected to said output of said equality comparator circuit, whereby said timer is enabled by the output from said equality comparator circuit and operates, after a delay period, to pass a signal to said memory means causing its output signal to fall such that said equality comparator circuit no longer produces an output signal and said brakes are consequently reapplied.

5. An anti-skid device as defined in claim 4, wherein said timer also includes a control input which is connected to said decelerometer, whereby the length of said timer delay period is varied in dependence on the instantaneous deceleration of the vehicle.

6. An anti-skid device as defined in claim 1, wherein the device includes a safety circuit having a second timer with a fixed time delay, whereby said output signal from said equality comparator is fed to said safety circuit, the latter operating to cut off the electrical supply to said device if said output signal from said equality comparator is continuously produced for longer than said fixed time delay.

* * * * *